United States Patent [19]

Luria

[11] Patent Number: 5,159,994
[45] Date of Patent: Nov. 3, 1992

[54] FOOD STORAGE AND DELIVERY SYSTEM FOR PASSENGER VEHICLES, PARTICULARLY AIRCRAFT

[75] Inventor: David Luria, Tel Aviv, Israel

[73] Assignee: Fuselage Engineering Services Ltd., Tel Aviv, Israel

[21] Appl. No.: 672,303

[22] Filed: Mar. 20, 1991

[30] Foreign Application Priority Data

Mar. 26, 1990 [IL] Israel ........................ 93877

[51] Int. Cl.⁵ .................................. B64D 11/04
[52] U.S. Cl. ........................ 186/40; 244/118.5; 414/331; 414/416
[58] Field of Search ................ 186/40, 46, 47, 48, 186/49, 50, 51; 244/118.5; 414/331, 416

[56] References Cited

U.S. PATENT DOCUMENTS

| | | | |
|---|---|---|---|
| 3,102,607 | 9/1963 | Roberts | 244/118.5 X |
| 3,179,208 | 4/1965 | Umanoff | 186/40 |
| 3,295,635 | 1/1967 | Cahn | 186/40 |
| 3,396,820 | 8/1968 | Kenny | 186/40 |
| 3,558,086 | 1/1971 | Kraly | 186/40 |
| 3,615,003 | 10/1971 | Rust | 186/40 X |
| 3,696,890 | 10/1972 | Armstrong | 186/40 |
| 3,999,630 | 12/1976 | McPhee | 186/40 |
| 4,660,787 | 4/1987 | Sprenger | 186/40 X |
| 5,032,053 | 7/1991 | Krieg | 414/331 X |

*Primary Examiner*—F. J. Bartuska
*Attorney, Agent, or Firm*—Benjamin J. Barish

[57] ABSTRACT

A food storage and delivery system for passenger vehicles having a plurality of seats separated by at least one aisle includes a rail mounted to the top of the vehicle and extending parallel to the aisle along its length, a carriage suspended from the rail, a food container on the carriage and movable along the length of the aisle, and a horizontal platform laterally of the rail for holding a plurality of the food containers, each alignable with the carriage for transferring the food container thereto.

21 Claims, 8 Drawing Sheets

FIG. 24

FOOD STORAGE AND DELIVERY SYSTEM FOR PASSENGER VEHICLES, PARTICULARLY AIRCRAFT

FIELD AND BACKGROUND OF THE INVENTION

The present invention relates to a food storage and delivery system for passenger vehicles. The invention is particularly useful for passenger aircraft, and is therefore described below with respect to this application.

The conventional passenger aircraft includes one or more galleys for preparing and distributing the food, and wheeled carts to be moved along the aisles when distributing the food to the passengers. One disadvantage of the existing systems is that the galleys take up considerable space, thereby decreasing the amount of space available for passenger seats. Another disadvantage is that when the food is being delivered, or the resulting trash is being collected, the respective aisle is substantially blocked. This interferes with the movement of the passengers along the aisle, and such movement, when required, interferes with the distribution of the food. In addition, the food carts usually require two attendants, one pushing from the rear and one pulling from the front.

There have been many proposals for food delivery systems for passenger vehicles, particularly aircraft, which include a rail mounted to the ceiling or floor of the vehicle and extending parallel to the aisle for delivering the food articles to the passengers. Examples of food delivery systems of this type are described in U.S. Pat. Nos. 3,102,607, 3,295,635, 3,396,820, 3,558,086, 3,615,003, 3,696,890 and 3,999,630. However, insofar as I am aware, such previously proposed systems have not come into significant use.

OBJECTS AND BRIEF SUMMARY OF THE INVENTION

An object of the present invention is to provide a novel food storage and delivery system for passenger vehicles.

According to the present invention, there is provided a food delivery system for passenger vehicles having a plurality of seats separated by at least one aisle, comprising: a rail mounted to the top of the vehicle and extending parallel to the aisle along the length thereof; a carriage suspended from the rail above the seats and movable along the length thereof; a food container for containing food articles, the food container being carried on the carriage and movable therewith along the length of the aisle; and a horizontal platform laterally of the rail, above the seats, and horizontally aligned with the carriage for holding a plurality of the food containers, each horizontally aligned with the carriage for transferring the food container thereto.

According to further features in the described preferred embodiments, the carriage includes food lowering means for lowering the food articles contained in the food container below the carriage to a delivery location conveniently accessible for delivery to the passengers. Also, the horizontal platform is of a length and width to store at least one horizontal line of food containers in side-by-side relation, and includes a horizontal conveyor for conveying the food containers sequentially to the carriage. The horizontal conveyor comprises a pair of transfer members on opposite sides of the platform and engageable with the opposite ends of each container, and a pair of drives for driving the transfer members, and the container engaged thereby, towards and away from the carriage.

According to further important features in the described embodiments, the food containers include a plurality of separate compartments each for containing an article of food. The compartments are arranged in a plurality of horizontal rows and vertical columns, and the food containers further include a vertical partition of thermal insulation insulating at least one vertical column of compartments from the other vertical columns. The food containers are formed with a window in their top and bottom walls for heating or cooling the insulated vertical column of compartments in order to heat or cool the food articles therein.

One system is described below for purposes of example wherein the carriage includes retainers for retaining the food container on the carriage, and the food lowering means includes an extractor assembly for selectively extracting individual articles of food from the food container and for lowering the extracted food article to the delivery location. More particularly, the extractor assembly comprises an extractor head, and an extractor drive for driving the head to a selected location of the food container in order to extract the food article at the selected location; and the food lowering means comprises a vertical conveyor for receiving the extracted food article and for lowering same to the delivery location.

As will be more apparent from the description below, a food storage and delivery system in accordance with the foregoing features enables the space over the entrance aisle, over the cross aisles, the conventional galleys, and/or the toilets to be used for storing the food containers. In many cases this would reduce the need for a conventional galley, thereby freeing the space for the conventional galley for additional passenger seats. Such a food storage and distribution system may therefore be called an "upper galley" system.

Another advantage provided by the novel system is that it enables the passengers to select from a wider variety of menues and greatly facilitates the distribution of the food according to the individual selections by the passengers. Thus, the selections by the passengers can be stored in a central computer, which computer then controls the extraction of each selection for each passenger.

A further advantage in the described food storage and distribution system is that it greatly facilitate the distribution of food to the passengers and does not require blocking the aisle when the food is being distributed or the trash collected. Accordingly, there is less interference with the movement of the passengers or crew along the aisle, and where such movement is required, less interference by such movement with the distribution of the food to the passengers.

A still further advantage is that the carriage in such a rail system may be easily moved by a single attendant, and therefore enables a significant reduction in the number of attendants required in the distribution of food and in the collection of the trash.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
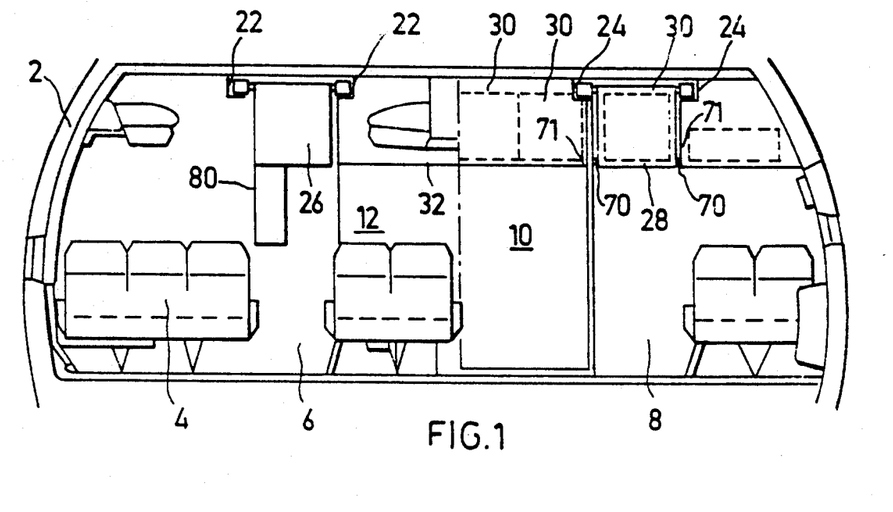
FIG. 1 is a vertical section of a passenger aircraft equipped with a food delivery system in accordance with the present invention.

With reference first to FIG. 1, there is illustrated a vertical section of an aircraft 2 provided with a plurality of passenger seats 4 separated by two aisles 6, 8. For purposes of example, one of the aisles is bordered by a cross-aisle (or entrance aisle) shown at 10, and the other aisle is bordered by a group of toilets shown at 12. The spaces above the cross-aisle, entrance aisle, conventional galley, and/or the toilets, are used for storing the food containers, thereby reducing the need for a conventional galley; accordingly, the novel system of the present invention may be called an "upper galley" system. In addition, the upper galley system of the present invention also utilizes the normal aisles for distributing the food to the passengers and for collecting the trash, but does so in a manner which does not interfere with the normal traffic along the aisles, and which does not permit the normal traffic along the aisles to interfere with the distribution of the food or the collection of the trash.

Figure 2:
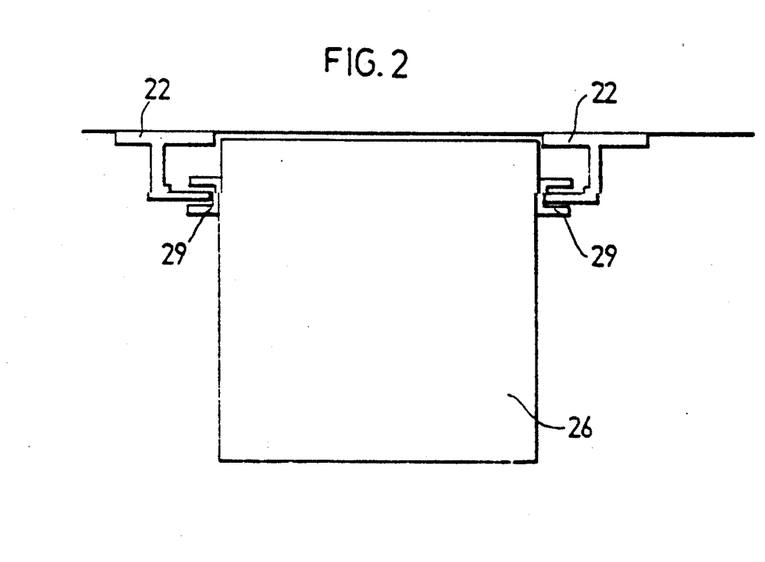
FIG. 2 illustrates the food carriage unit suspended from the overhead rail in the food storage and delivery system of FIG. 1.

The food delivery system constructed in accordance with the present invention comprises two pairs of rails 22, 24 (or two single rails, if a single-rail system is used) mounted to the top of the passenger cabin and extending parallel to the aisles 6, 8. Thus, rails 22 overlie and extend parallel to aisle 6, and rails 24 overlie and extend parallel to aisle 8. The food delivery system further includes a carriage 26, 28, suspended from each pair of rails 22, 24 and movable along the length of the respective aisle. For purposes of example, carriage 26 is shown in FIG. 1 in its operative condition for distributing the food, whereas carriage 28 is shown in its non-operative condition when not used for distributing food. At all times except when the carriage is actually being moved along its rails, it is locked to the rails by electrically-actuated locking elements 29, as shown in FIG. 2.

Figure 3:
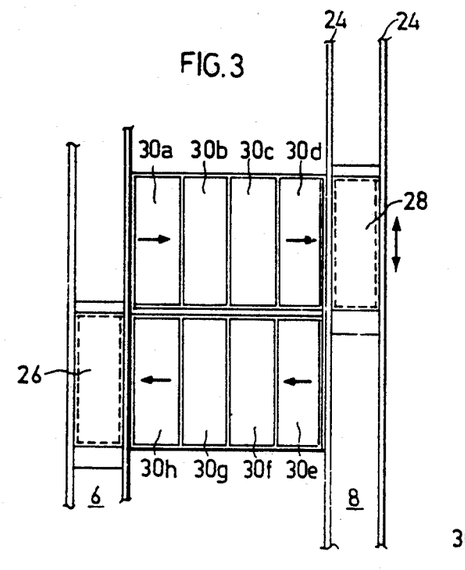
FIG. 3 is a top plan view illustrating the storage locations of the food containers in an aircraft having at least two aisles.

The illustrated food delivery system further includes a plurality of food containers for containing the food articles, which food containers are adapted to be carried by the respective carriages 26, 28 and to be moved therewith along the length of the aisles. FIG. 3 more particularly illustrates the food containers supported over the toilets 12, and/or the cross-aisle 10, and cooperable on its opposite sides with the two carriages 26, 28 suspended by rails 22 for movement along the two aisles 6, 8. As shown in FIG. 3, there are eight of such food containers 30, labelled 30a-30h, supported on a horizontal platform 32 over the toilets 12, and/or the cross-aisle 10, and arranged in side-by-side relation in two horizontal rows.

FIG. 3 also shows how the illustrated arrangement of food containers facilitates their application to the two carriages 26, 28. Thus, when food container 30d, adjacent to carriage 28 over aisle 8, is applied to that carriage, food container 30h, adjacent to carriage 26 over aisle 6, may be applied to that carriage. When the containers on both carriages have been emptied, each may be removed from its respective carriage and applied at the end of the other row from which it originated, to thereby apply the food containers, and remove the empty ones, according to the counter-clockwise flow direction illustrated by the arrows in FIG. 3. The movement pattern of the containers could of course also be in the opposite (i.e. clockwise) direction.

Figure 4:
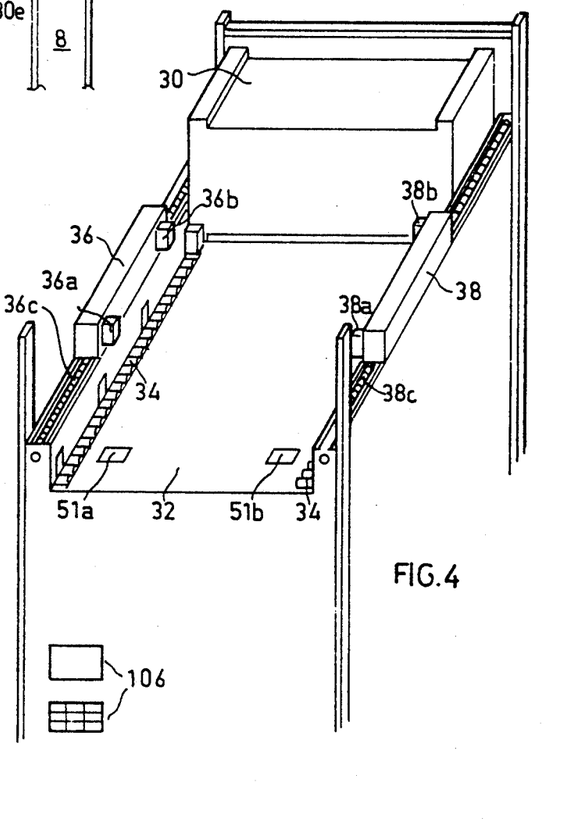
FIG. 4 is a three-dimensional view illustrating the arrangement for transferring the food containers from their storage location to the carriage in the food delivery system of FIG. 1.

FIG. 4 illustrates the upper galley for storing the food containers 30 and for sequentially conveying each container to the carriages 26, 28 for loading thereon. Thus, the horizontal platform 32 supporting the food containers 30 is provided with a plurality of rollers 34 on each side of the respective line of containers for rollably supporting the containers. Each container is moved by a pair of transfer members 36, 38 disposed on opposite sides of its respective row of containers. Each transfer member has a pair of projections 36a, 36b, 38a, 38b, which may be extended, as shown in FIG. 4, to engage the opposite sides of the container to be conveyed to the carriage, and which may be retracted when the transfer members are returned to engage another carriage. The two transfer members 36, 38 are driven towards and away from their respective carriages by screw drives 36c, 38c. These screws drive the two transfer members 36, 38 in the same direction (FIG. 4) and speed when their projections are extended, to convey a container to the respective carriage, and in the opposite direction (upwardly, FIG. 4).

Figure 5:
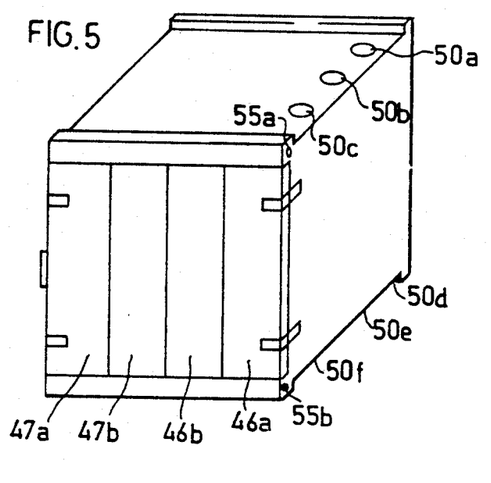
FIG. 5 illustrates one of the food containers in the system of FIG. 1.
Figure 6:
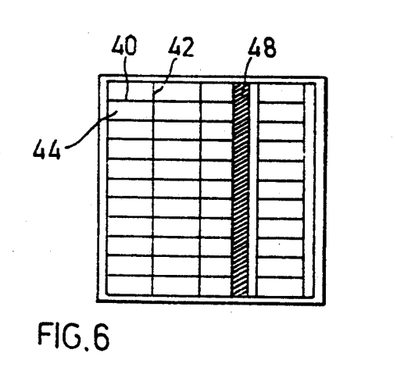
FIG. 6 diagrammatically illustrates the construction of the food container of FIG. 5.

FIGS. 5 and 6 illustrate the construction of each of the food containers 30. The interior of each food container is divided, by a plurality of horizontal shelves 40 and vertical partitions 42, into a plurality of compartments 44 arranged in horizontal rows and vertical columns. The front of the container is closed by a pair of accordion-type doors 46, 47. FIG. 6 illustrates, for purposes of example, the container as being divided into eleven horizontal rows and four vertical columns.

The interior of each container is further provided with a vertical partition of thermal insulation material 48 insulating one column (the rightmost column) from the three other columns. With such an arrangement, the rightmost column may include hot (or cold) foods to be kept hot (or cold), and therefore thermally insulated from the other three vertical columns containing foods, cutlery, napkins, etc., not requiring thermal insulation.

Figure 4A:
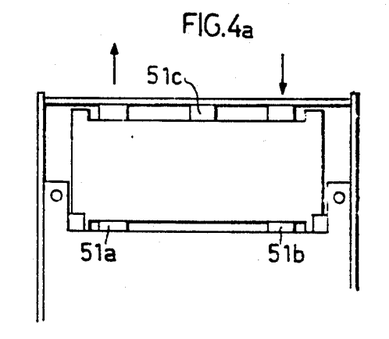
FIG. 4a illustrates the manner of heating (or cooling) a food container while in a storage location.

The upper galley where the food containers are stored may be provided with a plurality of heating (or cooling) units, as shown more particularly in FIG. 4a for heating (or cooling) the food at least within the insulated compartment of the containers. Thus, the top wall and/or bottom wall of each container may be provided with a plurality of windows, as shown at 50 in FIG. 5, for heating (or cooling) the food within the insulated column of compartments in the respective container. For example, the heating of the food can be effected by microwave heaters (e.g., magnetrons), shown at 51a-51c in FIG. 4a, aligned with the windows 50 of the food containers. Alternatively, the windows could be open and hot (or cold) air could be passed through them, e.g. from bottom wall to top wall or vise versa, in order to heat (or cool) the food articles within the insulated compartments of the containers.

Figures 7, 8:
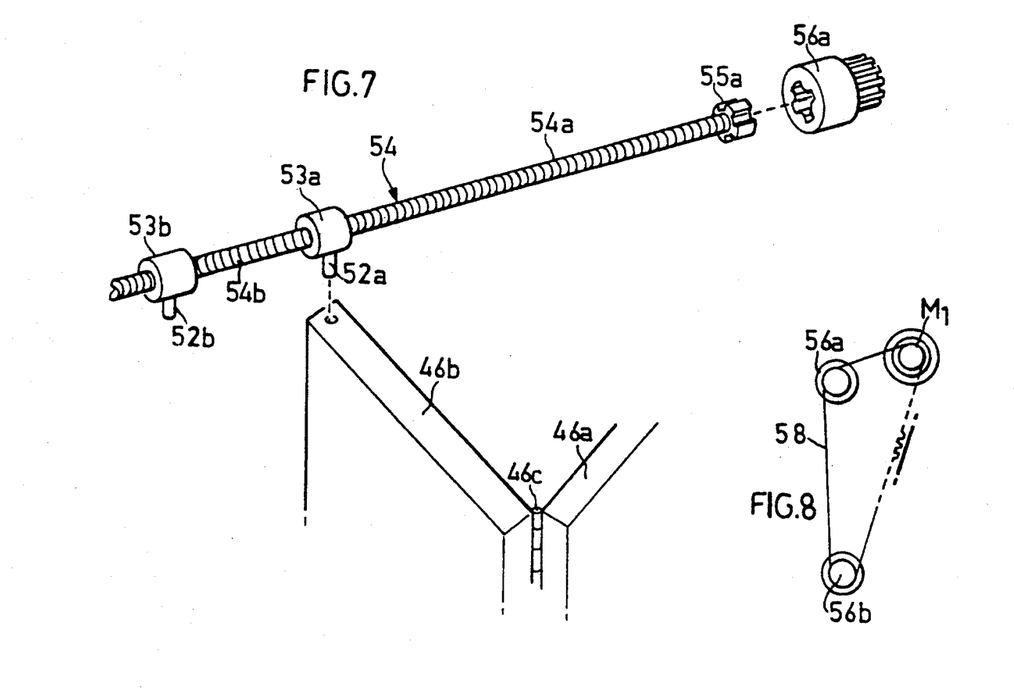
FIGS. 7 and 8 illustrate the drive for opening and closing the door of the food container of FIG. 5.

FIGS. 7 and 8 illustrate the manner of opening and closing the accordion-type doors 46, 47. Thus, as shown in FIG. 7, door 46 includes two sections (46a, 46b) hinged together along their confronting edges (46c). The opposite end of the inner section (46b) is coupled by a pin 52a carried by a nut 53a to threads 54a of a screw 54. The end of the screw terminates in a head 55a received within a knob 56a which may be rotated manually, or by motor $M_1$ (FIG. 8).

Threads 54a of screw 54 are of one-hand, so that the rotation of the screw moves the nut 53a in one direction (namely rightwardly in FIG. 7). The other end of screw 54 is formed with threads 54b of the opposite hand cooperable with a nut 53b carrying a pin 52b received within an opening in the free end of the other door 47 so that the rotation of the screw in the direction moving section 46b of door 46 rightwardly, will move the corresponding section 47b of door 47 leftwardly. Thus, rotating screw 54 in one direction will open the doors 46, 47, and moving the screw in the opposite direction will close the doors.

A similar screw mechanism is provided at the lower end of the container cooperable with the lower ends of the accordion doors 46, 47 and terminating in a similar head 55b at the lower end of the container. FIG. 8 illustrates the manner of coupling both knobs 56a, 56b to the motor $M_1$, via a closed-loop belt 58, so as to drive both knobs together, in one direction to open the accordion doors 46, 47, and in the opposite direction to close them.

The construction of each of the carriages 26, 28 is more particularly shown in FIGS. 9-16 illustrating the structure of carriage 26.

Figure 10:
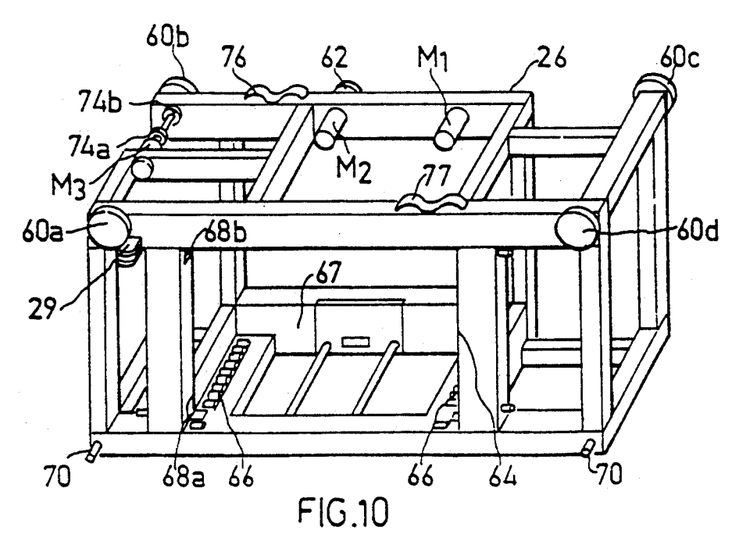
FIG. 10 more particularly illustrates the carriage of FIG. 9.

Thus, carriage 26 is suspended from its pair of rails 22 by means of four wheels 60a-60d located at the four corners of the carriage, and is driven by a traction wheel 62 coupled to a drive motor $M_2$ (FIG. 10). Carriage 26 is formed with a rectangular socket 64 of a size to receive one of the containers 30 when attached to the carriage. The bottom part of the carriage is further provided with two rows of rollers 66 (FIG. 10) at the opposite ends of the socket to facilitate moving the food container with respect to the carriage. One side of the socket 64 is formed with a wall 67 to limit the movement of the container into the carriage, and the opposite side of the opening is formed with off/on retainer plates 68a-68d at its four corners to retain the container when received within the carriage socket.

Carriage 26 is further formed with a pair of locking pins 70 at its opposite lower ends which are projectible into two openings formed in fixed members 71 (FIG. 1) of the aircraft for locking the carriage in its home position (overlying the cross-aisle or enterance aisle 10 or toilets 12) at all times except when the food delivery system is being used for delivering food to the passengers.

When the food delivery system is being used, each carriage 26, 28 may be moved in both directions by traction motor $M_2$ or manually, along its respective rails 22, 24. As indicated earlier each carriage 26, 28 further includes a locking device 29 (FIG. 2) which is normally in an actuated condition to lock the carriage to the respective rail, to prevent movement of the carriage except when the carriage is actually to be moved, at which time the locking device is released to permit this movement. As soon as the movement has terminated, the locking device is automatically reactuated to lock the carriage in position.

Figures 22, 23:
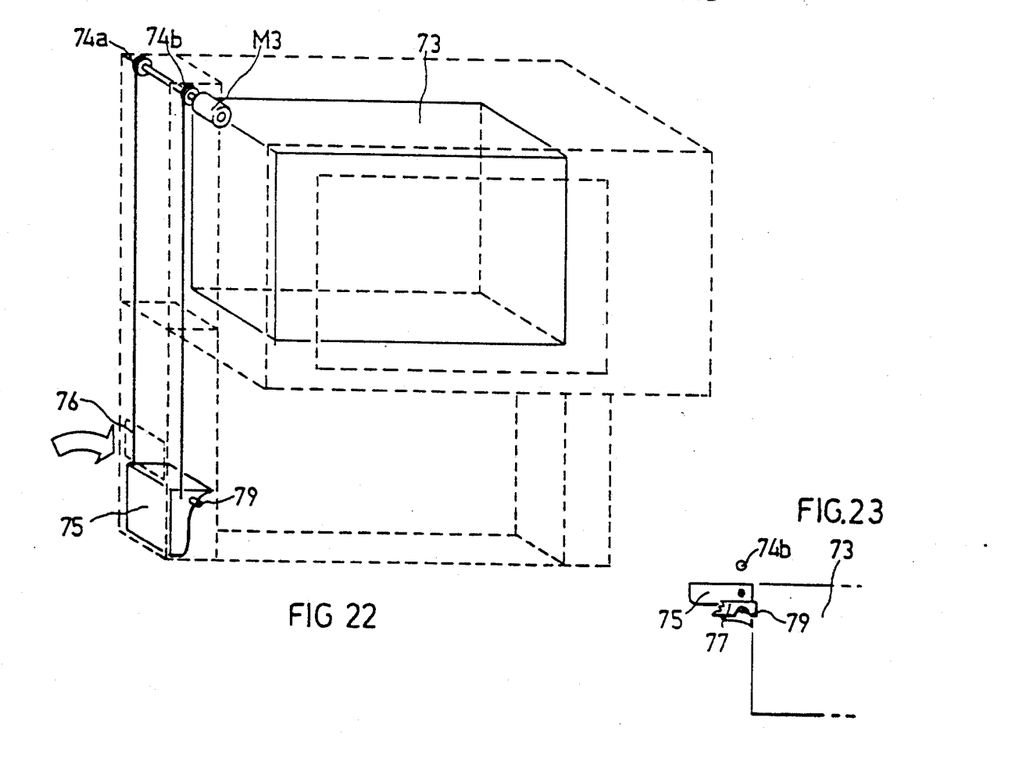
FIGS. 22 and 23 illustrate a trash collector which may be included in the food delivery system for collecting the trash.

Each carriage 26, 28 is adapted to receive, not only a food container 30 when delivering food, but also a trash container 73 (described below with respect to FIGS. 22 and 23), instead of the food container, when the trash is to be collected. For this purpose, each carriage is provided with a pair of rollers 74a, 74b driven by a small electric motor $M_3$ at one side (left side) of the carriage for driving a trash collection receptacle 75 to dump the trash into the trash container 73, as shown in FIGS. 22 and 23.

Each carriage 26, 28 also includes a slip connector 76 for making electrical connections to a fixed conductive strip (not shown) supplying electrical power to the electrical devices carried by the carriage; and another slip connector 77 for making the electrical connections to another conducive strip (not shown) for connecting the computer in the carriage the main computer of the system, as more particularly described below with respect to FIG. 24.

Figure 9:
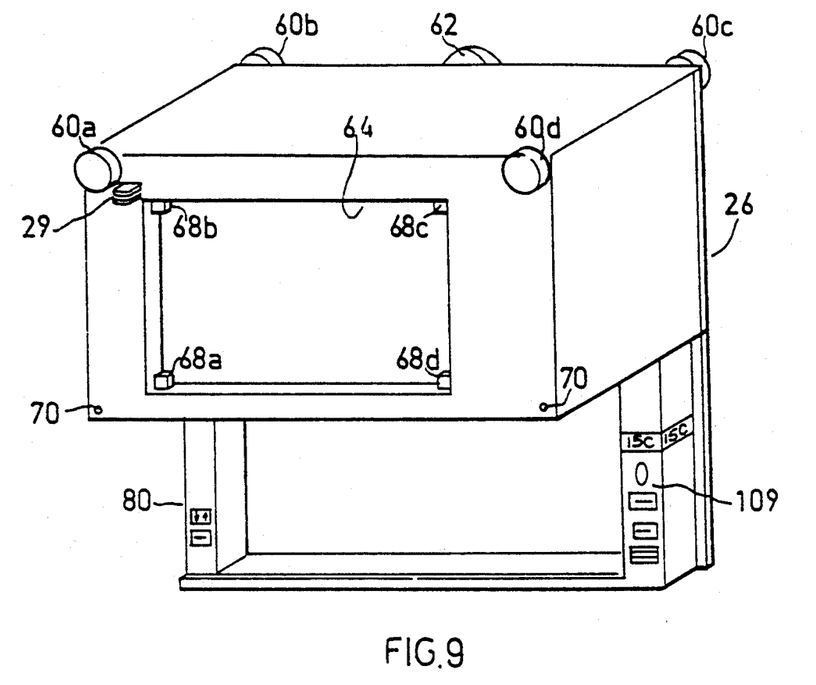
FIG. 9 illustrates the carriage in the food delivery system of FIG. 1.

Each carriage 26, 28 is further provided with an extractor assembly, generally designated 80, for selectively extracting individual articles of food from the various compartments in the food container 30 carried by the carriage, and for lowering the extracted food articles to a delivery location conveniently accessible to the attendant for delivering to the passengers. Extractor assembly 80 includes an extraction head 82 and a depending delivery section 83. In FIGS. 1 and 9, the delivery section 83 of the extractor assembly 80 of carriage 26 is shown in its lowered operative position; whereas in FIG. 1, the delivery section of the extractor assembly for carriage 28 is shown in its raised non-operative position. The structure and operation of each extractor assembly 80 are more particularly illustrated in FIGS. 11–16 and 21.

Figures 11, 12, 13, 14, 14A, 15:
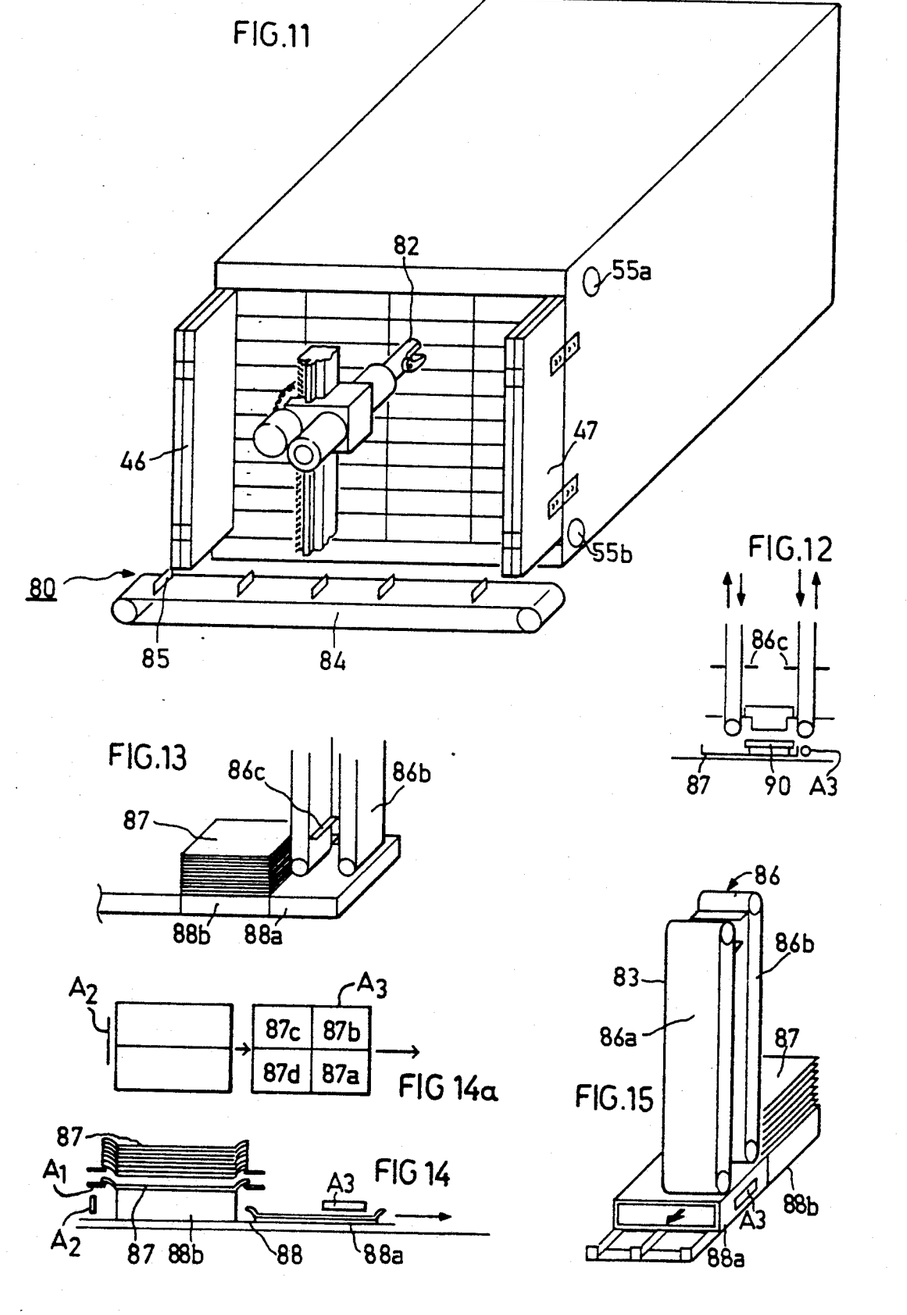
FIGS. 11-14, 14a and 15 illustrate the manner of extracting a selected food article from the food container and placing it in its appropriate location on the food tray for delivery to the passenger.
Figure 16:
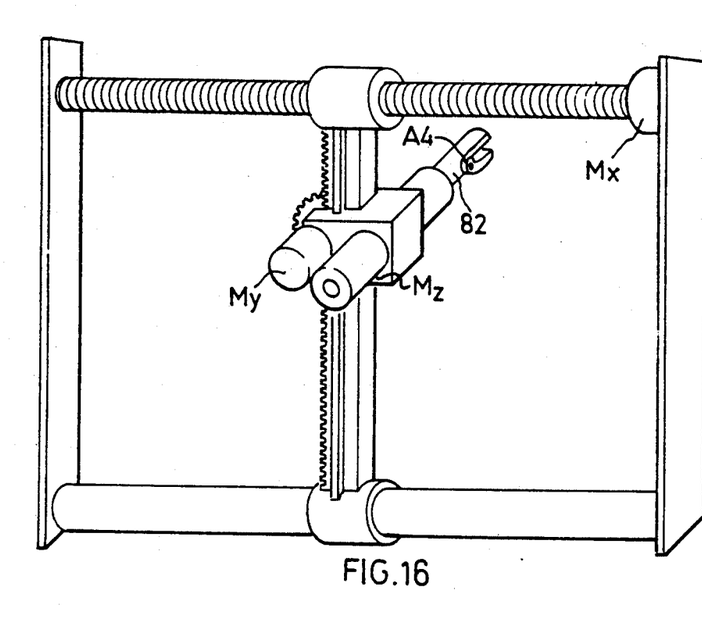
FIG. 16 illustrates the drive for the extractor assembly of FIG. 11.

Thus, as shown in FIGS. 11 and 16, the extractor head 82 of each extractor assembly 80 is selectively drivable along the two coordinate axes by drive motors Mx, My so as to be alignable with any one of the compartments within the container. Extractor head 82 is also drivable along the third coordinate axis by motor Mz towards and away from the selected compartment so as to extract the food article in the selected compartment and to deliver same to a horizontal conveyor 84 underlying the extractor head. Horizontal conveyor 84 is a closed-loop belt formed with a plurality of partitions 85 defining discrete areas each for receiving an extracted food article. The extracted food articles are conveyed to a vertical conveyor 86 at one end of the horizontal conveyor 84, which vertical conveyor lowers the respective food articles onto a tray 87 underlying the vertical conveyor 86.

The vertical conveyor 86 is constituted of two vertically-extending closed-loop belts 86a, 86b each carrying a plurality of spaced brackets 86c such that two brackets support between them each food article as the brackets are lowered by the rotation of the belts.

The trays 87 are supported on a table 88 at the delivery location. Table 88 includes a section 88a underlying the vertical conveyor 86, and another section 88b laterally spaced from section 88a for receiving a stack of trays 87.

An actuator A₁ releases the bottommost tray 87 in the stack on table section 88b.

Actuator A₂ moves the tray to cause its quarter 87b to underlie the vertical conveyor 86 in order to receive a food article therefrom. As actuator A₃ is then actuated to shift the food article on tray 87 from 87b to 87a. Then another food article is released on quarter 87b. Actuator A₂ is then actuated to shift the tray to aligned the quarter 87c with the vertical conveyor for receiving a food article thereon, and then actuator A₃ is actuated to shift the food article from quarter 87c to quarter 87d and another food article is released on quarter 87c. Accordingly by selectively controlling the actuators A₁–A₃, the food article may be deposited on any one of four selected locations on the tray.

The extractor assembly 80 includes a further actuator A₄ for actuating the movable jaw 82a (FIG. 21) of the ettractor head 82 to a clamping position for clamping thereto the food article in the selected compartment to be extracted from the food container, and to a releasing position when releasing the food article after it has been conveyed to the horizontal conveyor 84.

Figure 17:
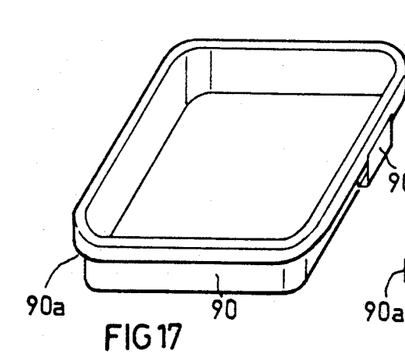
FIG. 17 illustrates one of the food holders in the food delivery system of FIG. 1.
Figure 18:
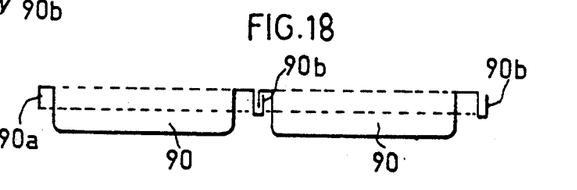
FIG. 18 illustrates the manner in which the extraction of one food holder causes the advancement of the next food holder.
Figure 19:
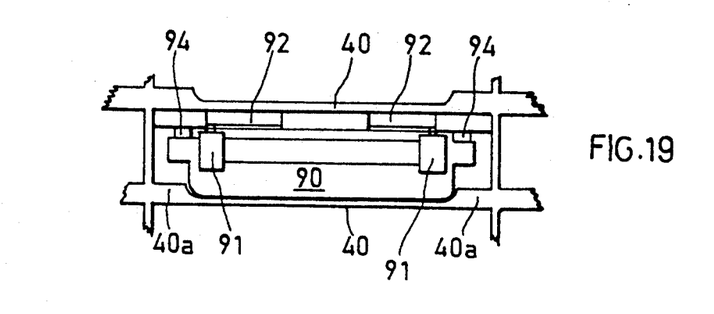
FIGS. 19 and 20 illustrate the retainer arrangement for retaining the food holders in the food container until extracted by the extractor assembly.
Figures 20, 21:
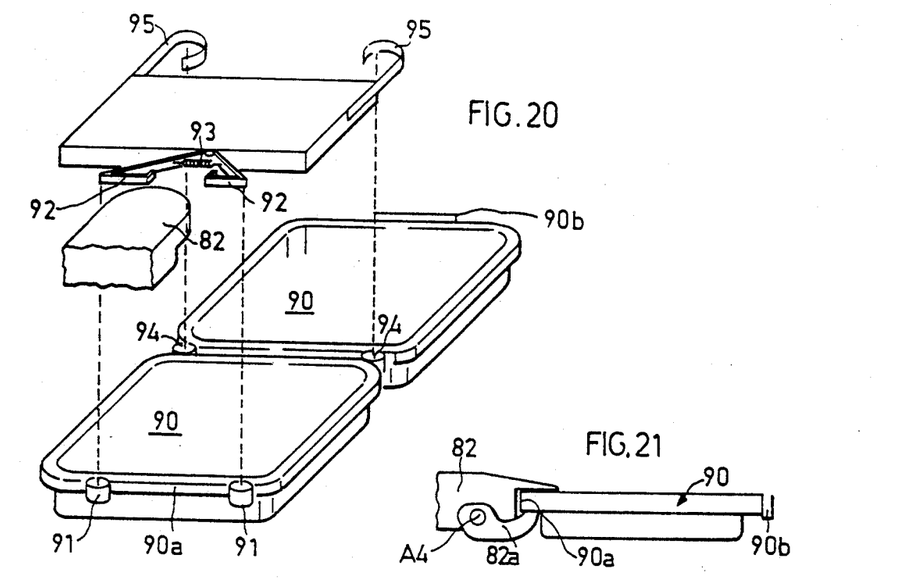
FIG. 21 illustrates the manner of attaching the extractor head to each food dish.

The food articles are placed in individual holders, in the form of dishes, each slidably received on one of the shelves 40 (FIG. 6) of the food container 30. FIGS. 17 and 18 illustrated the construction of each of these food dishes, therein designated 90, to permit the extractor head 82 to clamp itself to a selected food dish and to remove it to the horizontal conveyor 84 during one operation of the extractor assembly, while at the same time advancing the next food dish into position for extraction during a subsequent operation of the extractor assembly. FIGS. 19 and 20 illustrate the structure of each shelf for stably supporting each food dish on its respective shelf while permitting the extraction head to extract each dish and to advance the next one for subsequent extraction.

As shown in FIGS. 17 and 18, each food dish 90 is formed with a peripheral flange 90a which is downwardly-open so as to be engageable by the extraction head 82 when actuated to its clamping position as illustrated in FIG. 21. Each dish 90 further includes an upwardly-open hook 90b receivable in the downwardly-open flange 90a of the next dish, such that when the extraction head 82 extracts one dish 90 during one operation, the next dish in the row is automatically advanced to position for extraction during a subsequent operation.

As shown in FIGS. 19 and 20, the shelves 40 are formed with guiding slots 40a for receiving the dishes and for guiding them during their movement. Each shelf 40 includes a first pair of stoppers 91 carried at the opposite ends of a first pair of spring arms 92 attached below the front end of the respective shelf so as to be cooperable with the front dish 90 on the underlying shelf 40. The two spring arms 92 are urged by a coil spring 93 towards each other, but the front parts of their arms converge towards their center such that when the extractor head 82 is received between the ends of the two spring arms, it spreads them apart. The extractor head thereby also spreads apart the stoppers 91, to release the front dish 90 and to permit the extraction head 82, when in its clamped condition (FIG. 21) to pull-out the dish located in the front position on the shelf.

Each shelf 40 includes a further pair of stoppers 94 carried by a pair of flexible arms 95 and cooperable with the back side of the front dish supportive on the underlying shelf 40. The flexible arms 95 normally urge their stoppers 94 against the back side of the front dish, and thereby prevent rearward movement of the dish, whereas stoppers 91, engaging the front side of the dish, prevent forward movement of the dish. As the front dish is pulled-out of its shelf by extraction head 82, the next succeeding dish engages the flexible arms 95 to spread apart the stoppers 94 and thereby to permit the next dish to be advanced to the position of the front dish then being removed. All the stoppers 91 and 94 are preferably made of rubber or plastic also to provide some cushioning.

It will thus be seen that the stoppers 91 on the two spring arms 92 engaging the front end of the front dish of the row prevent forward movement, and the stoppers 94 carried by spring arms 95 engaging the rear end of the front dish prevent rearward movement of the front dish. Thus, both groups of stoppers stably retain the front dish in its position on its respective shelf until it is to be extracted by the extractor head 82. When the extractor head is thus applied to extract the front dish 90, the head separates the two arms 92 to move aside the two stoppers 91, clamps onto the annular flange 90a of the front dish (as shown in FIG. 21), and extracts the front dish from the container. During the extraction of the front dish, hook 90b on its rear end, engaging flange 90a of the next adjacent dish, advances the latter dish into position for withdrawal during a subsequent operation of the extractor assembly, this being permitted by arms 95 being spread apart during this advance movement of the next dish.

It will also be appreciated that the third, fourth, etc. dishes in the same row are similarly advanced one position, which is also permitted by the spreading of the arms 95 to move apart the stoppers 94 for each respective dish.

As indicated earlier, each carriage 26, 28 is adapted to receive a trash container, shown at 73 in FIG. 22, in lieu of the food container 30, when the trash is to be collected. Thus, the trash container 73 (FIG. 22) is received within the same socket 64 (FIG. 9, 10) receiving the food container 30 during the distribution of the food.

Trash container 73 includes a trash receptacle 75, which is normally in a lower position within the trash container, the latter having an opening 76 facing outwardly for passing the trash into receptable 75. Trash receptacle 75 may then be raised by motor $M_3$ (FIG. 10) which drives the two rollers 74a, 74b to raise the receptacle into engagment with an abuttment member 77. The latter member pivots pin 79 of the receptacle and thereby causes it to dump its contents into the trash container 73, as shown in FIG. 23.

Figure 24:
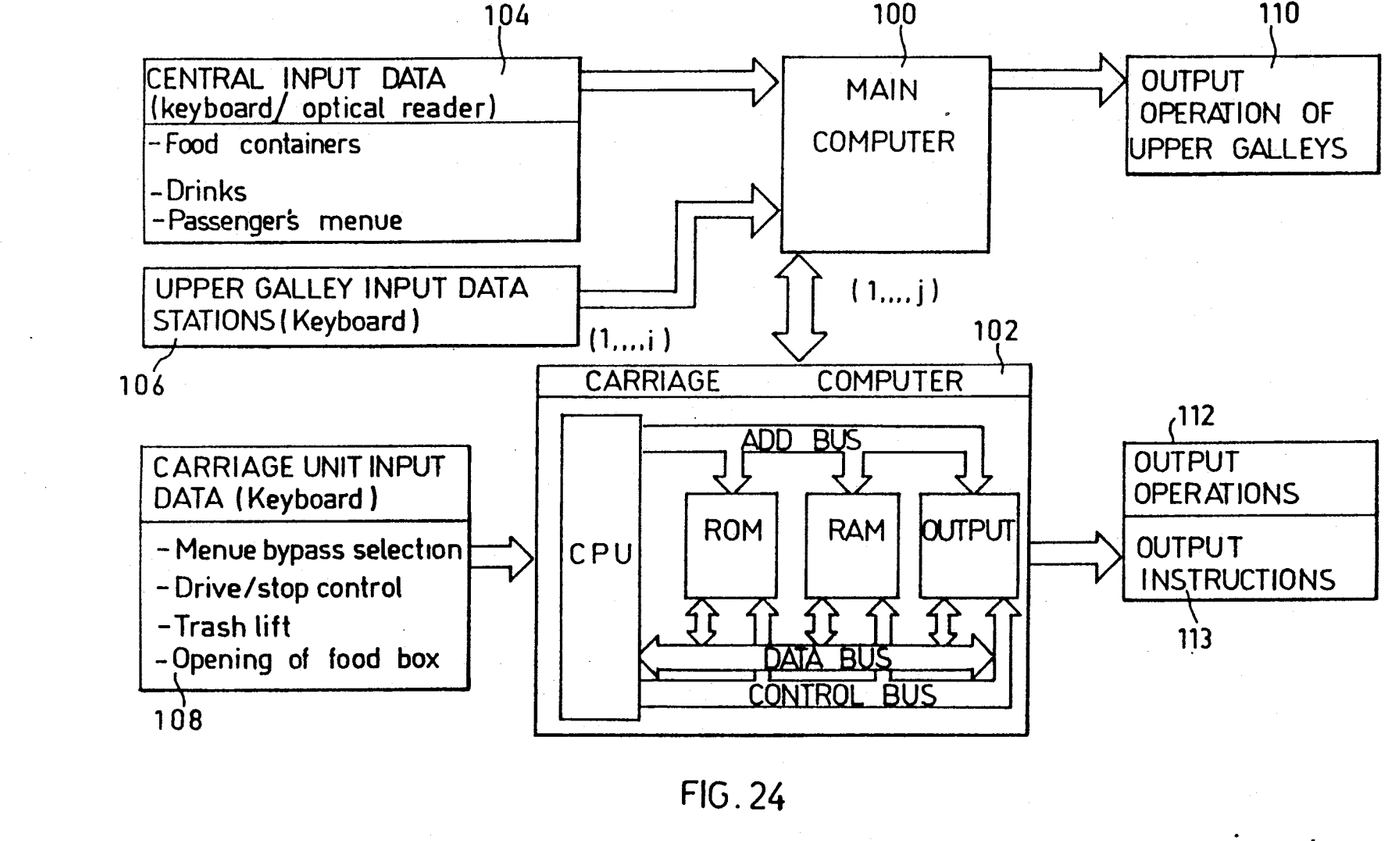
FIG. 24 is a block diagram illustrating the overall operation of the system of FIGS. 1-23.

FIG. 24 is a block diagram illustrating the various electronic controls present in the food distribution system of FIGS. 1–23. Thus, it includes a main computer, generally designated 100, controlling the overall operations of the system. Each of the carriages (e.g., 26, 28), is provided with a separate carriage computer 102. Data is inputted into the main computer 100 via a central input data station 104, which may include a keyboard, optical reader, or other suitable input device at a convenient central location. The inputted data includes information concerning the kinds, number, locations and contents of the food dishes provided within the food containers 30 in each of the rows; the various kinds, contents and locations of the drinks, cutlery, napkins, etc., which may also be provided in the food containers 30; and initial passengers menu selections related to the seat numbers of the aircraft. The data from input 104 is inputted by the crew attendants from data supplied by the food suppliers and by the passengers, the latter at the time of selecting their respective menus.

Further data is inputted by the attendants, via a separate input unit indicated by block 106, for the operation of the upper galley. Further data may be inputted by the attendant, via a separate input unit indicated by block 108, for the operation of each carriage.

Each computer 102 carried by the respective carriage (e.g., 26, 28) is connected to the main computer 100 for receiving its data. In addition, each computer 102 is also supplied with additional data, inputted via its input block 108, concerning menu bypass selection, drive/stop control, trash lift, opening of the food container, etc. Such controls are conveniently accessible to the attendant when the extractor assembly 80 is in its lowered, operative position as illustrated in FIG. 9.

The main computer 100, in addition to supplying control data to computer 102 for each carriage, also controls certain operations as indicated by block 110, including loading, clamping, and discharging the food containers 30 with respect to the carriages, as well as overall monitoring operations. Computer 102 on each carriage controls other various operations of the carriage, including its motors, conveyors, extractor assemblies, actuators, carriage stops, etc., as indicated by block 112. Each computer 102 also provides instructions and information to the attendant, as indicated by block 113 (e.g., food designation to the passenger in seat 15c) by means of a monitor or printer as shown in FIG. 9.

The overall operation of the system illustrated in FIGS. 1–24 will be apparent from the above description.

Thus, the food is delivered to the aircraft in a plurality of containers 30, which are stored in the space over the entrance aisle or cross-aisles 10 (FIGS. 1, 2), above the toilets 12 (FIG. 1), and/or over a conventional galley, which spaces can now be called the "upper galley". At all times except when the food is actually to be distributed, the food containers are locked against movement on their respective platforms, and the carriages (26, 28) are also locked against movement on their respective rails 22, 24. During such times, the delivery section 83 of the extractor assembly 80 of each carriage 26, 28 is in its upper non-operative position, as indicated by carriage 28 in FIG. 1. Also, the hot (or cold) food articles within the food containers may be heated (or cooled) by passing hot (or cold) air through their upper openings 50 (FIG. 5) thereby heating (or cooling) the food articles in the rightmost (FIG. 6) vertical column of compartments, which compartments are insulated from the other compartments by the thermal insulation partition 48.

Before food is to be distributed, the menu selections of the passengers are inputted by the attendant and stored in the main computer 100.

When food is to be distributed, the delivery sections 83 of the extractor assemblies 80 of the two carriages 26, 28 are moved to their lower, operative positions, as shown in carriage 26 of FIG. 1. In addition, one of the food containers 30 is advanced into the socket 64 of each of the carriages 26, 28, and locked within the carriage by locking elements 68a–68d (FIGS. 9, 10).

The two illustrated carriages 26, 28 may then be individually moved along their respective tracks 22, 24, over the aisles 6, 8, to each row of seats at the time the food is being distributed to the passengers in the seats. Each passenger may advise the attendant of any changes in the menu selections, and these changes may be inputted, via the control unit 109 of the respective carriage. The extractor head 82 will then extract the food dishes 90 within the food container 30, according to the selections, and deposit each selection on the horizontal conveyor 84 (FIG. 11). The latter conveyor conveys these selections to the vertical conveyor 86, which deposits each selection in the appropriate locations on the tray 87. After all the selections have been placed on the tray, the tray is delivered to the passenger.

As described above, particularly with reference to FIGS. 17–21, as each extractor head attaches itself to a selected food dish 90 and withdraws it from the food container 30, the hook 90b at the trailing end of the food dish advances the next food dish into place for access by the extractor head during a subsequent operation of the retractor assembly. In addition, during this extraction operation, the stoppers 91 and 94, normally in position to secure each food dish against movement, are separated to permit the first food dish to be extracted, and the subsequent food dishes in the same row to be advanced one position.

As each food container is emptied, it is removed from its respective carriage 26, 28, and the next one is then applied to the carriage, according to the counter-current (or other suitable) flow sequence illustrated by the arrows in FIG. 3.

When the food delivery operation has been completed, the same carriages 26, 28 are used for collecting the trash. At this time, the food container 30 is removed from the respective carriage 26, 28, and instead a trash container 73 (FIG. 22, 23) is applied. Each trash container 73 includes a collection receptacle 75. The receptacle is normally in a lower position accessible for receiving the trash, and when full, is raised by motor M3 do dump its contents into the trash container 73.

It will thus be seen that the food storage and distribution system illustrated in FIGS. 1-24 provides an "upper galley", and thereby reduces the need for the conventional galley in an aircraft. The upper galley so provided frees considerable space that would otherwise be required for the conventional galley for passenger seating. In addition, the upper galley system described obviates the need for wheeled food carts which are moved along the passengers aisles, thereby freeing the aisles for passenger movement. This greatly facilitates the distribution of the food, as well as adds to the convenience of the passengers and crew, since they are not longer blocked from movement along the aisles during the food distribution. Moreover, such movement, when required, does not interfere with the food distribution. In addition, moving the carriages along their overhead rails, which can be done by the drive motors or manually, is considerably easier than moving wheeled carts, so that only one attendant is needed for this, rather than two as in the conventional wheeled cart system. Further, the illustrated system better enables each passenger to select individual menus, which selections are automatically placed on the passenger's tray adjacent to the passenger's seat, at the time of delivering the food to the passenger.

While the invention has been described with respect to a preferred embodiment applicable to passenger aircraft, it will be appreciated that many other variations and modifications of the invention may be made, and that the invention could also be used in other applications, such as passenger trains, buses and ships.

What is claimed is:

1. A food storage and delivery system for passenger vehicles having a plurality of seats separated by at least one aisle, comprising:
   a rail mounted to the top of the vehicle and extending parallel to said aisle along the length thereof;
   a carriage suspended from said rail above said seats and movable along the length of said aisle;
   a food container for containing food articles, said food container being carried on said carriage and movable therewith along the length of said aisle;
   and a horizontal platform laterally of said rail, above said seats, and at the same level as, so as to be horizontally aligned with, said carriage for holding a plurality of said food containers, each horizontally aligned with said carriage for transferring a food container thereto.

2. The system according to claim 1, wherein said carriage includes food lowering means for lowering the food articles contained in the food container below said carriage to a delivery location conveniently accessible for delivery to the passengers.

3. The system according to claim 1, wherein said horizontal platform is of a length and width to store at least one horizontal line of food containers in side-by-side relation, and includes a horizontal conveyor for conveying said food containers sequentially to said carriage.

4. The system according to claim 1, wherein said food containers include a plurality of separate compartments each for containing an article of food therein.

5. The system according to claim 4, wherein said compartments are arranged in a plurality of horizontal rows and vertical columns.

6. The system according to claim 5, wherein said food containers further include a vertical partition of thermal insulation insulating at least one vertical column of compartments from the other vertical columns.

7. The system according to claim 6, wherein said food container is formed with a window through a wall thereof for heating or cooling said insulated vertical column of compartments in order to heat or cool the food articles therein.

8. The system according to claim 4, wherein said food container includes an accordion-type door at one end thereof, which is normally closed but which may be opened to provide access to the food articles therein.

9. The system according to claim 1, further including a trash box adapted to be attached to said carriage, instead of said food container, for receiving trash.

10. The system according to claim 2, wherein said carriage includes retainers for retaining said food container on said carriage, and said food lowering means includes an extractor assembly for selectively extracting individual articles of food from said food container and for lowering the extracted food article to said delivery location.

11. The system according to claim 10, wherein said extractor assembly includes an extractor head, and an extractor drive for driving said head to a selected location of said food container in order to extract the food article at said selected location; and wherein said food lowering means comprises a vertical conveyor for receiving the extracted food article and for lowering same to the delivery location.

12. The system according to claim 11, wherein said extractor assembly further includes a horizontal conveyor for receiving the extracted food article and for conveying it to the upper end of the vertical conveyor.

13. The system according to claim 11, wherein said carriage further includes a horizontal support at said delivery location for supporting a stack of trays; and a feeding device for feeding a tray from the stack to underlie the vertical conveyor in a position to receive the article of food lowered thereby.

14. The system according to claim 13, wherein said horizontal support includes tray locating means for locating the tray in any one of a plurality of selected positions with respect to the lower end of said vertical conveyor in order to receive the food article therefrom at a selected location on said tray.

15. The system according to claim 11, wherein said vertical conveyor comprises a pair of vertically-extending closed-loop belts each carrying a plurality of brackets adapted to receive the food article extracted by said extractor assembly and to lower same to said delivery location.

16. The system according to claim 11, wherein said food container includes a plurality of horizontal shelves slidably supporting a plurality of food holders in end-to-end relation; each of said holders including a hook at its rear end facing away from said extractor assembly, engageable with a flange at the front end of the next holder facing the extractor assembly, such that the extraction of one holder during one operation of the extractor assembly automatically advances the next food holder in position for extraction by the extractor assembly during a subsequent operation thereof.

17. The system according to claim 16, wherein said retainers comprise a first pair of stoppers carried at the opposite ends of a first pair of spring arms attached to the front end of the respective shelf, and configured so as to be spread apart by the extractor head to release the front food holder; and a second pair of stoppers carried at the opposite ends of a second pair of spring arms attached to the shelf; said second pair of stoppers being engageable with the back end of the food holder, and being configured so as to be spread apart thereby when it is extracted to simultaneously advance the next food holder.

18. The system according to claim 11, further including a centralized computer for storing the food selections for passengers, for displaying said selections, and for controlling said extractor assembly in accordance with said selections.

19. The system according to claim 1, wherein said vehicle is an aircraft, and said horizontal platform overlies a cross-aisle, a conventional galley, a plurality of toilets of the aircraft.

20. A food storage and delivery system for passenger vehicles having a plurality of seats separated by at least one aisle, comprising:

a rail mounted to the top of the vehicle and extending parallel to said aisle along the length thereof;

a carriage suspended from said rail and movable along the length thereof;

a food container for containing food articles, said food container being carried on said carriage and movable therewith along the length of said aisle;

and a horizontal platform laterally of said rail for holding a plurality of said food containers, each alignable with said carriage for transferring the food container thereto;

said horizontal platform being of a length and width to store at least one horizontal line of food containers in side-by-side relation, and including a horizontal conveyor for conveying said food containers sequentially to said carriage;

said horizontal conveyor comprising a pair of transfer members on opposite sides of the platform and engageable with the opposite ends of each container, and a pair of drives for driving the transfer members, and the container engaged thereby, towards and away from said carriage.

21. The system according to claim 20, wherein said drives are screw drives on opposite sides of said platform, said platform including rollers for rollably supporting the food container engaged by said transfer members to facilitate transfer thereof to said carriage.

* * * * *